(12) United States Patent
Frederick, Jr. et al.

(10) Patent No.: US 11,152,139 B2
(45) Date of Patent: Oct. 19, 2021

(54) POWER RAIL STITCHING TECHNIQUE

(71) Applicant: Arm Limited, Cambridge (GB)

(72) Inventors: Marlin Wayne Frederick, Jr., Austin, TX (US); Karen Lee Delk, Austin, TX (US); Sharrone Rena Smith, Austin, TX (US)

(73) Assignee: Arm Limited, Cambridge (GB)

( * ) Notice: Subject to any disclaimer, the term of this patent is extended or adjusted under 35 U.S.C. 154(b) by 418 days.

(21) Appl. No.: 16/036,673

(22) Filed: Jul. 16, 2018

(65) Prior Publication Data

US 2020/0020464 A1 Jan. 16, 2020

(51) Int. Cl.
| | |
|---|---|
| *H01B 13/00* | (2006.01) |
| *H02B 3/00* | (2006.01) |
| *G06F 30/392* | (2020.01) |
| *H01L 27/02* | (2006.01) |
| *G06F 119/06* | (2020.01) |
| *H01L 27/118* | (2006.01) |

(52) U.S. Cl.
CPC ....... *H01B 13/0036* (2013.01); *G06F 30/392* (2020.01); *G06F 2119/06* (2020.01); *H01L 27/0207* (2013.01); *H01L 27/0292* (2013.01); *H01L 27/0296* (2013.01); *H01L 2027/11881* (2013.01); *H02B 3/00* (2013.01)

(58) Field of Classification Search
CPC ............ H01L 27/0207; H01L 27/0292; H01L 27/0296; H01L 2027/11881; G06F 30/392; G06F 2119/06; H01B 13/0036; H02B 3/00
See application file for complete search history.

(56) References Cited

U.S. PATENT DOCUMENTS

2003/0023937 A1* 1/2003 McManus ........... H01L 27/0207
257/204

FOREIGN PATENT DOCUMENTS

JP    2007243093 A  *  9/2007

\* cited by examiner

*Primary Examiner* — A. Dexter Tugbang
(74) *Attorney, Agent, or Firm* — Pramudji Law Group PLLC; Ari Pramudji (57) ABSTRACT

Various implementations described herein refer to a method. The method may include providing multiple rows of cells having porosity segments including a first row of cells having first porosity segments and a second row of cells having second porosity segments that are arranged differently than the first porosity segments. The method may include providing multiple power distribution rails for the multiple rows of cells having a first power distribution rail and a second power distribution rail disposed adjacent to the first row of cells and the second row of cells. The method may include adjusting position of the second row of cells with respect to the first row of cells to align one or more of the second porosity segments with one or more of the first porosity segments to enable rail stitch insertion between the first power distribution rail and the second power distribution rail.

20 Claims, 8 Drawing Sheets

POWER RAIL STITCHING TECHNIQUE

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Some technologies implement a standard cell power rail on two parallel metal layers with one intervening metal layer interposed therebetween. In some scenarios, the intervening metal layer may be utilized to electrically connect the two parallel metal layers along with a via above and below the intervening metal layer. This intervening metal layer and two via structure is referred to as a rail stitch. These rail layers are referred to as Mx and Mx+2, and the intervening stitch layer as Mx+1.

The insertion of the rail stitch is achieved prior to placement, post placement, or post route. Since the rail stitch may be restricted by cell structures or routing to access pins in the standard cells to both sides of the rail layers, the decision on when to insert the rail stitch either inhibits placement of cells (pre-place) or inhibits the number or legal stitches (post placement or post route). As such, these scenarios leave the designer to choose between a negative impact on cell placement or impaired circuit behavior from excessive spans between multiple rail stitches.

BRIEF DESCRIPTION OF THE DRAWINGS

Implementations of various power distribution techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to power rail stitching schemes and techniques that are associated with power distribution circuitry. For instance, various implementations described herein are directed to schemes, techniques and methods related to power distribution for silicon process technologies. Some implementations may be associated with power supply distribution and power management along with methods for distributing power by way of rail stitches coupled between power distribution rails. For instance, various implementations described herein provide schemes and techniques to improve stitch insertion rate post placement or post route. In this instance, by shifting cell placement either during a placement legalization step or as a post placement optimization step, the distance between legal stitch sites may be substantially reduced. Further, in this instance, small shift amounts may work because in general some cells may have many locations that are open or porous relative to rail stitches.

Various implementations of power rail stitching schemes and techniques will now be described in greater detail herein with reference to FIGS. 1-7.

Figure 1A:
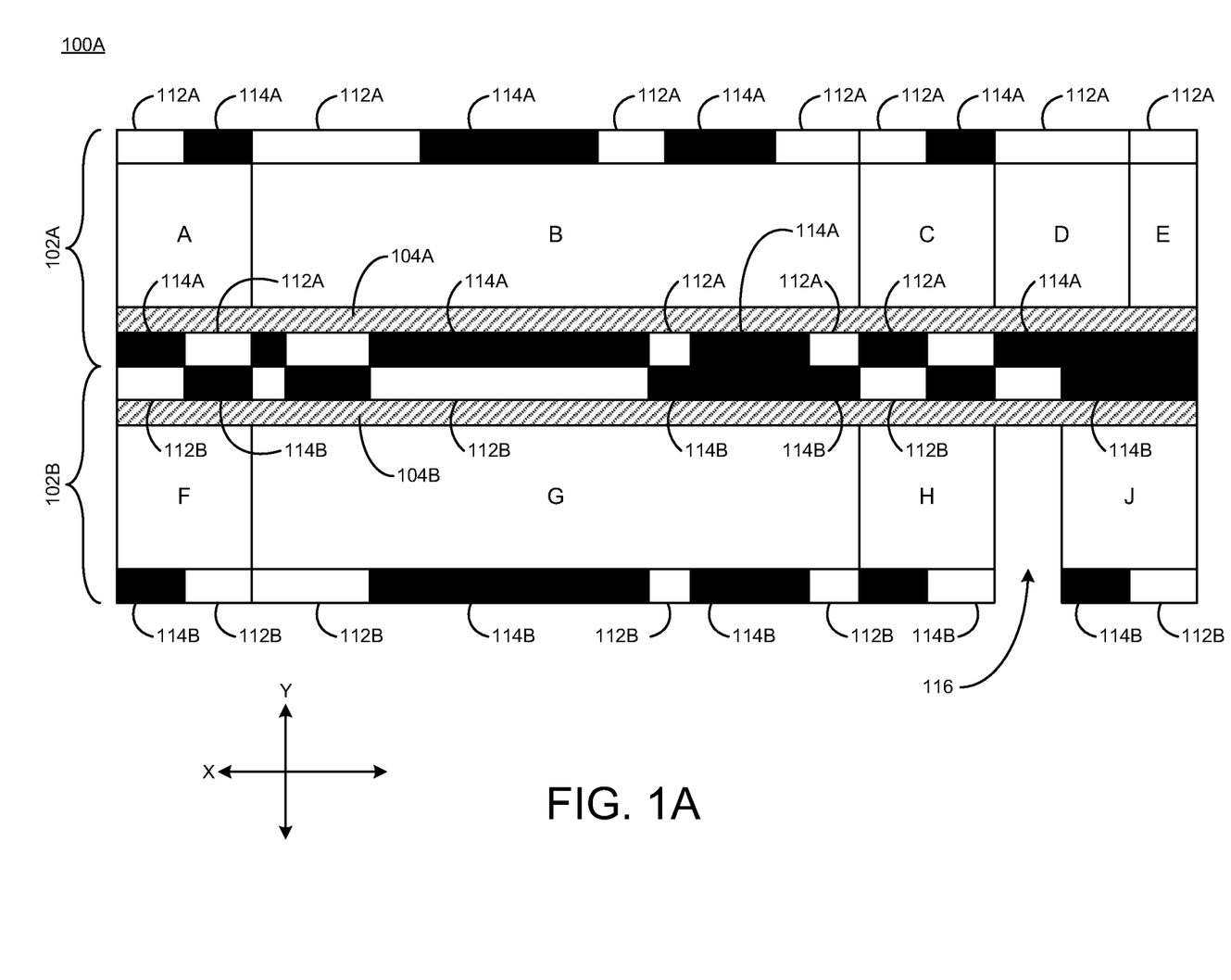
FIG. 1A illustrates a diagram of power distribution circuitry in accordance with various implementations described herein.

FIG. 1A illustrates a diagram of power distribution circuitry 100A in accordance with various implementations described herein. In some implementations, FIG. 1A shows an example of placed cells without stitch alignment optimization.

As shown in FIG. 1A, the power distribution circuitry 100A may include multiple layers including, e.g., a multi-layered structure having multiple rows of cells 102A, 102B having porosity segments 112A, 112B, i.e., a first row of cells 102A (e.g., cells A, B, C, D, E) having first porosity segments 112A and a second row of cells 102B (e.g., cells F, G, H, J) having second porosity segments 112B that may be arranged differently than the first porosity segments 112A. In some implementations, each of the cells (A, B, C, D, E, F, G, H, J) may be implemented as power gate cells. Further, in some implementations, the second porosity segments 112B may be arranged differently than the first porosity segments 112A such that one or more of the second porosity segments 112B are offset from one or more of the first porosity segments 112A by some distance. Also, the multiple rows of cells 102A, 102B may have blockage segments 114A, 114B along with the porosity segments 112A, 112B. For instance, the first row of cells 102A (e.g., cells A, B, C, D, E) may have first blockage segments 114A, and the second row of cells 102B (e.g., cells F, G, H, J) may have second blockage segments 114B that may be arranged differently than the first blockage segments 114A.

As described herein, alignment between the first porosity segments 112A and the second porosity segments 112B enable rail stitch insertion between a first power distribution rail 104A and a second power distribution rail 104B. In some instances, the first power distribution rail 104A may be formed in a first metal layer (e.g., an Mx layer), and the second power distribution rail 104B may be formed in a second metal layer (e.g., an Mx+2 layer) that is separated from the first metal layer (e.g., Mx) by two other metal layers (e.g., Mx+2). Further, as described herein, alignment between the first blockage segments 114A and the second blockage segments 114B inhibit rail stitch insertion between the first power distribution rail 104A and the second power distribution rail 104B. In some instances, one or more of the first row of cells 102A (e.g., cells A, B, C, D, E) and/or the second row of cells 102B (e.g., cells F, G, H, J) may have a gap or space between cells. For instance, as shown in FIG. 1A, the second row of cells 102B (e.g., cells F, G, H, J) may have a gap or space 116 disposed between one or more cells, such as, e.g., between cell H and cell J.

Figure 1B:
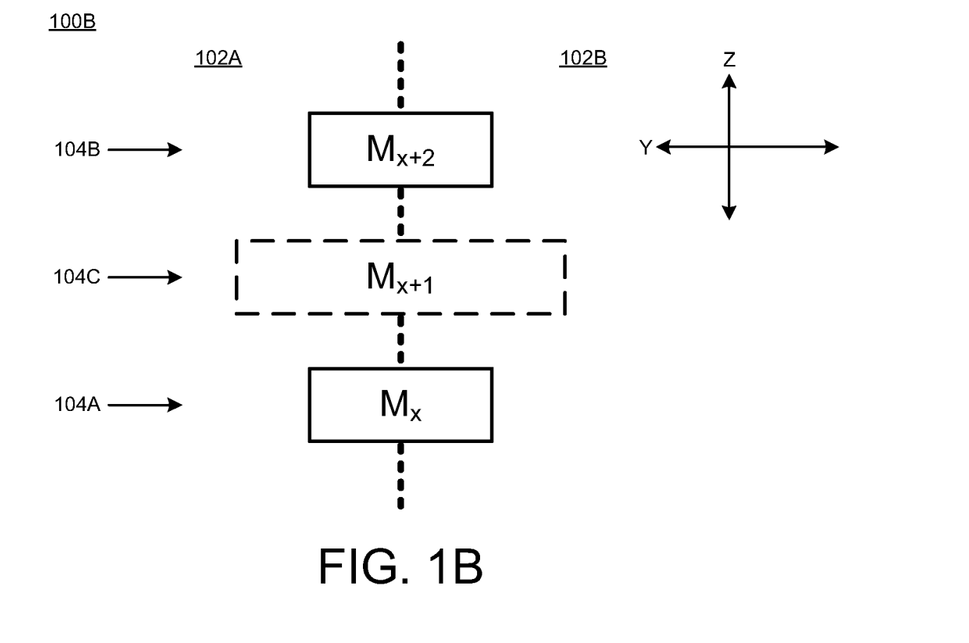
FIGS. 1B-1C illustrate diagrams of power distribution rails in accordance with implementations described herein.
Figure 1C:
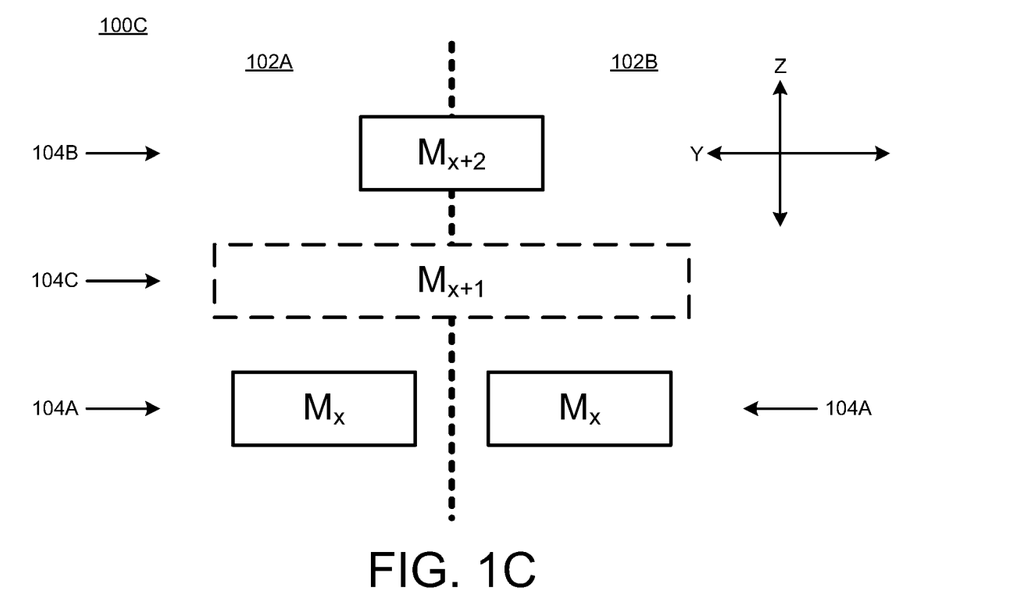

FIGS. 1B-1C illustrate diagrams 100B, 100C of power distribution rails 104A (Mx), 104B (Mx+2) along with intervening metal layer 104C (Mx+1) in accordance with implementations described herein.

Some examples of first and second power distribution rails 104A, 104B (along with intervening metal layer 104C) are shown in FIGS. 1B-1C. FIG. 1A shows cell and power distribution structures, as seen from above (X and Y). FIGS.

1B-1C show the first and second power distribution structure as seen down the rails 104A, 104B. For instance, FIG. 1A may be seen as Y and Z direction view of FIG. 1A being cut by a vertical line across FIG. 1A. In one example, a first image 100B in FIG. 1B shows rows 102A and 102B sharing a single Mx structure and a single Mx+2 structure, as seen from (Y and Z). In another example, a second image 100C in FIG. 1C shows rows 102A and 102B having a private Mx structure and a shared single Mx+2 structure, as seen from (Y and Z). It should be appreciated that there are many other possible combinations including, e.g., 2 or more Mx or Mx+2 structures with zero or one of the structures being shared and 1 or more of the structures being private. It is also possible to have this configuration repeat in the Z direction, i.e., stitching may be performed between Mx and Mx+2 as well as Mx+2 and Mx+4. The stitch may span more than one layer, wherein, e.g., Mx may be stitched to Mx+4 by Mx+1, Mx+2, and Mx+3. One key concept is that the structures may be related to a standard cell rail, and on two or more layers, the structures may need to be periodically connected together by one or more intervening metal layers, such as, e.g., the intervening metal layer 104C.

The power distribution circuitry 100A may include multiple power distribution rails 104A, 104B for the multiple rows of cells 102A, 102B, i.e., a first power distribution rail 104A and a second power distribution rail 104B may be disposed adjacent to the first row of cells 102A (e.g., cells A, B, C, D, E) and the first power distribution rail 104A and the second power distribution rail 104B may be disposed adjacent to the second row of cells 102B (e.g., cells F, G, H, J). The first power distribution rail 104A and the second power distribution rail 104B may be disposed adjacent to the first row of cells 102A and/or the second row of cells 102B. Also, both power distribution rails 104A, 104B may be providing power for one or both rows of cells 102A, 102B. The terms and/or phrase "disposed adjacent" may refer to being "disposed proximate to", which may include "overlap", "overlie", "close by", "near" and/or various other similar terms and/or phrases. In some implementations, the first power distribution rail 104A may refer to a first metal layer (e.g., Mx), and the second power distribution rail 104B may refer to a second metal layer (e.g., Mx+2) that is disposed away from the first power distribution rail (e.g., Mx) by at least one intervening metal layer (e.g., Mx+1). In various implementations, the power distribution rails 104A, 104B refer to conductive paths, such as, e.g., conductive metal paths or layers (Mx, Mx+1, Mx+2).

The power distribution circuitry 100A may provide a scheme and/or technique for adjusting position of the second row of cells 102B (e.g., cells F, G, H, J) with respect to the first row of cells 102A (e.g., cells A, B, C, D, E) to align one or more of the first porosity segments 112A with one or more of the second porosity segments 112B to enable rail stitch insertion between the first power distribution rail 104A and the second power distribution rail 104B. Also, adjusting the position of the second row of cells 102B (e.g., cells F, G, H, J) with respect to the first row of cells 102A (e.g., cells A, B, C, D, E) enables the rail stitch insertion to occur (or be achieved) at a target periodicity having a target distance between multiple rail stitches.

In some implementations, when the porosity segments 112A, 112B are aligned, a rail stitch may be inserted at a target position (e.g., aligned position) where one or more of the first porosity segments 112A are aligned with one or more of the second porosity segments 112B. The rail stitch insertion between the first power distribution rail 104A and the second power distribution rail 104B may refer to insertion of a conductive connection (e.g., metal stitch or staple) between the first power distribution rail 104A and the second power distribution rail 104B. In other implementations, when multiple porosity segments 112A, 112B are aligned, multiple rail stitches may be inserted at multiple target positions (e.g., multiple aligned positions) where the first porosity segments 112A are aligned with the second porosity segments 112B.

As described herein, each of the cells (A, B, C, D, E, F, G, H, J) in the first and second rows 102A, 102B may be implemented as power gate cells. The power gate cells may include one or more power gate circuits (or power switches, such as, e.g., one or more transistors operating as a power gate or switch) and one or more logic circuits (or logic gates, components, etc.). The power gate cell may include one or more power gate pin layers. For instance, the power gate pin layer may include one or more power gate pins used to electrically couple the power gate cell to the first power distribution rail 104A and/or the second power distribution rail 104B. The power gate pin layer may include one or more metal layers, such as, e.g., metal 2 (Mx+2) layer. The power gate cells may be referred to as a power gate, a power switch cell, or a power switch (PS).

In some implementations, a cell may be analyzed to predetermine where it is porous relative to a rail stitch. This analysis may be either pre-calculated and saved as part of the cells routing model or it may be achieved on the fly by a placement engine analysing the cell's contents. For instance, FIG. 1A shows the distribution circuitry 100A where the blockage segments 114A, 1146 are marked with black rectangular blocks as being incompatible with a rail stitch and the porosity segments 112A, 1126 are marked with white rectangular blocks as being compatible with a rail stitch.

Further, when cell placement is achieved, the porosity of two cells on either side of a standard cell power rail may interact. In this instance, a rail stitch is legal when both sides of the rail have cells with porosity in the same position. FIG. 1A shows an example of two adjacent rows of standard cells 102A, 1026 along with their porosity map, and as shown, the shaded regions represent Mx and Mx+2 metal layers of the cell rail. Also, the segment 116 between the H cell and the J cell is unoccupied and therefore is available for use by any cell as part of legalizing cell placement.

FIGS. 2-5 illustrate various block diagrams of adjusting the power distribution circuitry 100A in accordance with various implementations described herein. As shown, FIGS. 2 through 5 show various placement optimization schemes and techniques that consider cell stitch porosity when determining positions for rail stitch insertion. As described herein below, by considering the stitch porosity of the cells during placement legalization or as a post placement optimization step, it is possible to create room for inserting rail stitches by adjusting the placement of cell H, and/or the placement of both cell G and cell H, and/or by flipping cell H, and/or by flipping cell G and cell H, as well as some other solutions not shown in FIG. 200. The arrows indicate where stitch porosity is available for each permutation of placement or orientation of cell G and cell H.

Figure 2:
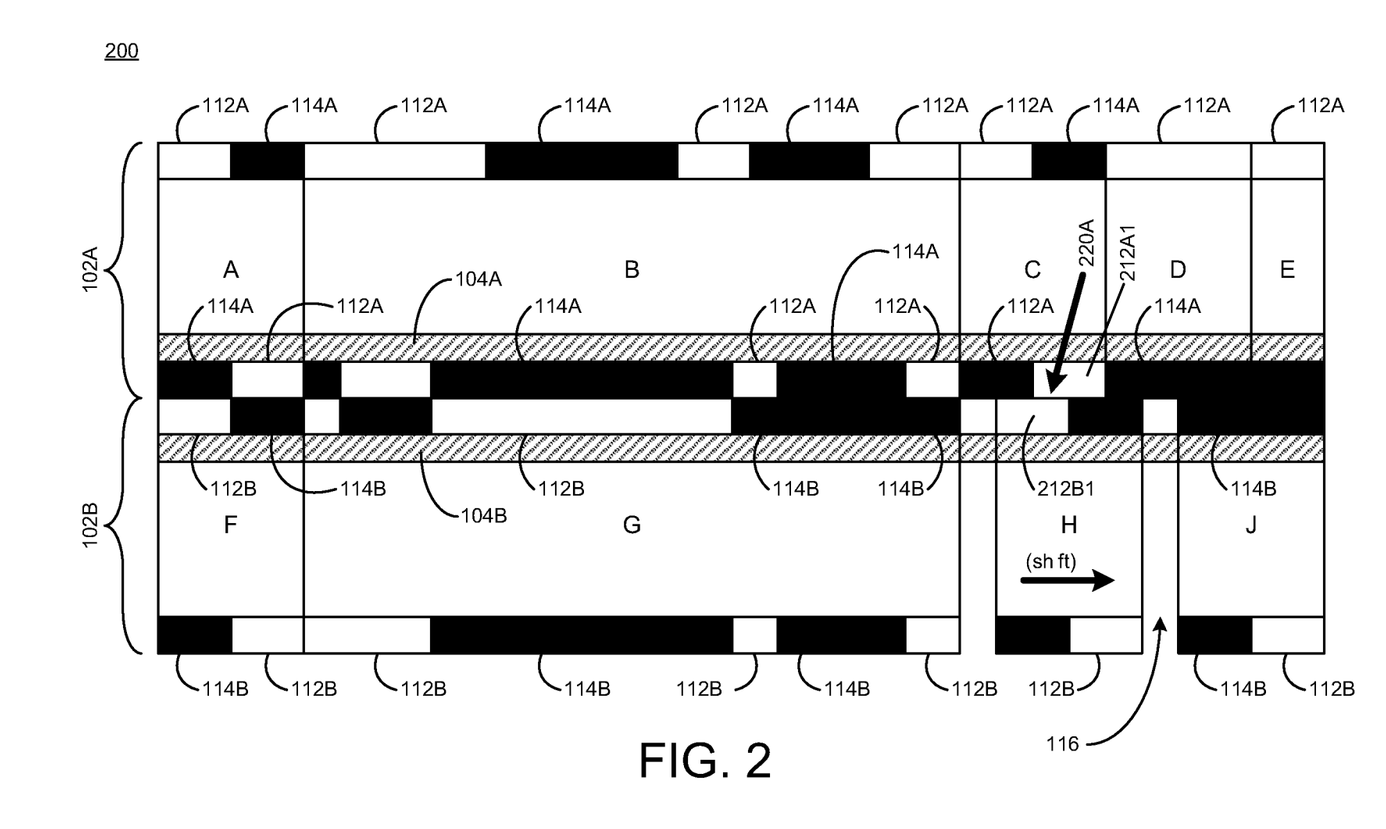
FIGS. 2-5 illustrate various diagrams of adjusting the power distribution circuitry in accordance with various implementations described herein.

For instance, FIG. 2 shows adjusting the position of the second row of cells 1026 (e.g., cells F, G, H, J) with respect to the first row of cells 102A (e.g., cells A, B, C, D, E). This adjustment may refer to shifting position of one or more cells (e.g., cell H) of the second row of cells 1026 (e.g., cells F, G, H, J) relative to the first row of cells 102A (e.g., cells A, B, C, D, E) to thereby align one or more of the second porosity segments 1126 with one or more of the first porosity segments 112A. In this instance, as shown in FIG. 2, cell H may be shifted in a first direction towards cell J so as to align a first porosity segment 212A1 with a second porosity segment 212B1. By shifting cell H, a first opening 220A may be achieved through the first and second porosity segments 212A1, 212B1 that enables for rail stitch insertion between the first power distribution rail 104A and the second power distribution rail 104B.

Figure 3:
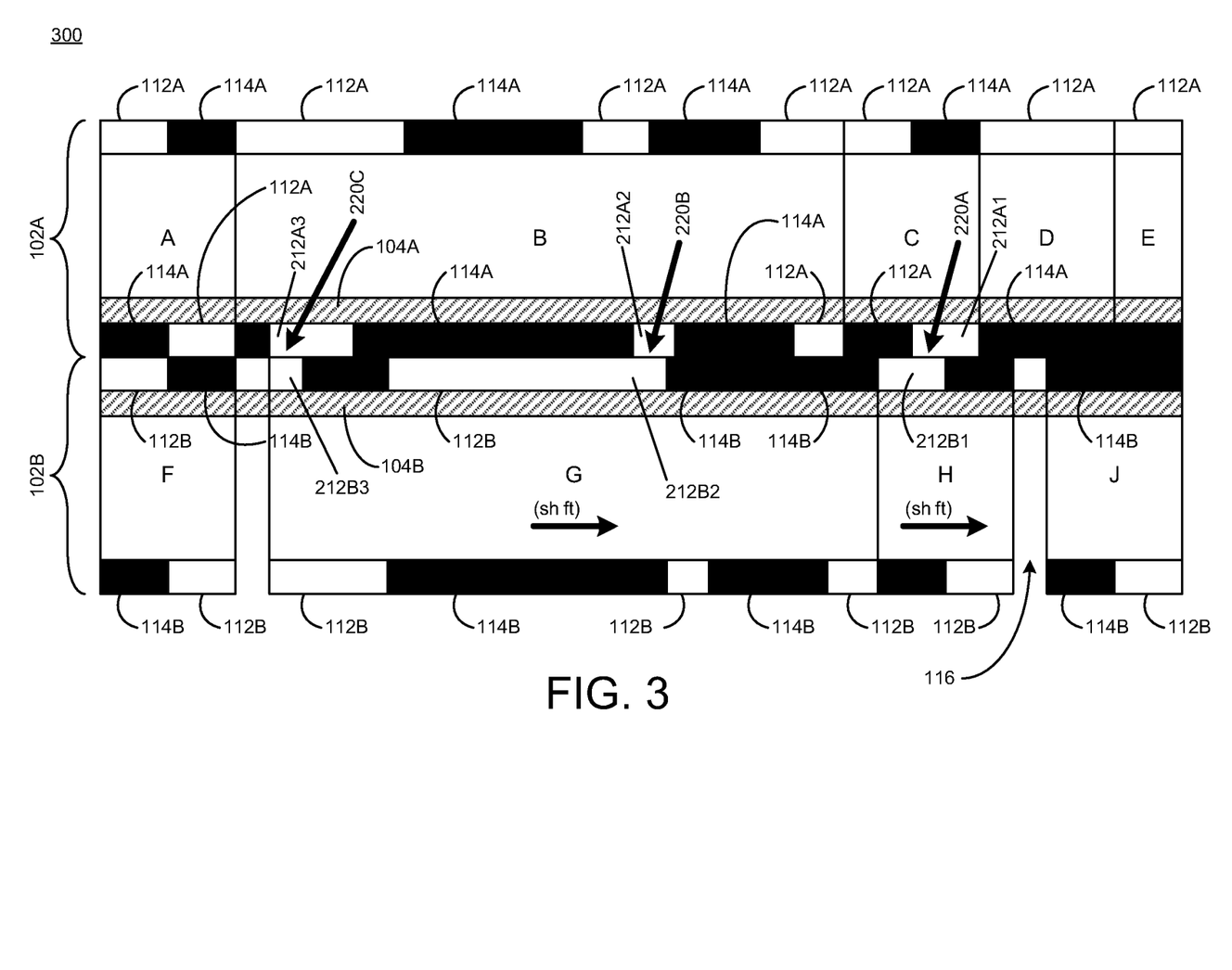

In another instance, FIG. 3 further shows adjusting the position of the second row of cells 102B (e.g., cells F, G, H, J) with respect to the first row of cells 102A (e.g., cells A, B, C, D, E). This adjustment may refer to shifting position of one or more other cells (e.g., cell G) of the second row of cells 102B (e.g., cells F, G, H, J) relative to the first row of cells 102A (e.g., cells A, B, C, D, E) to thereby align one or more of the second porosity segments 112B with one or more of the first porosity segments 112A. In this instance, as shown in FIG. 3, cell G may be shifted in a first direction towards cell H so as to align another first porosity segment 212A2 with another second porosity segment 212B2. By shifting cell G, a second opening 220B may be achieved through the first and second porosity segments 212A2, 212B2 that enables for rail stitch insertion between the first power distribution rail 104A and the second power distribution rail 104B. Also, a third opening 220C may be achieved through other porosity segments 212A3, 212B3 that enables for another rail stitch insertion between the first power distribution rail 104A and the second power distribution rail 104B.

Figure 4:
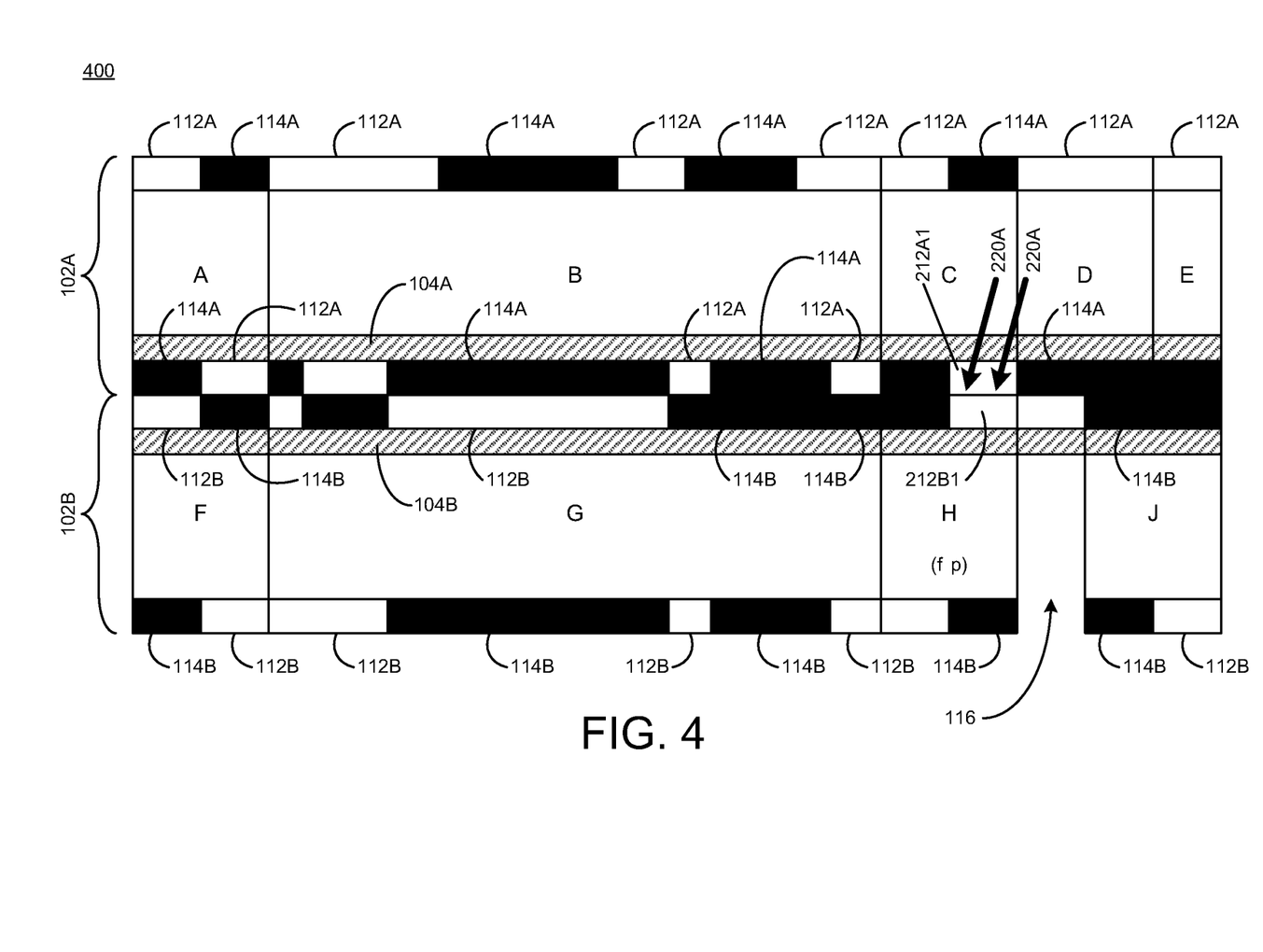

In another instance, FIG. 4 shows adjusting the position of the second row of cells 102B (e.g., cells F, G, H, J) with respect to the first row of cells 102A (e.g., cells A, B, C, D, E). This adjustment may refer to flipping orientation of one or more cells (e.g., cell H) of the second row of cells 102B (e.g., cells F, G, H, J) relative to the first row of cells 102A (e.g., cells A, B, C, D, E) to thereby align one or more of the second porosity segments 112B with one or more of the first porosity segments 112A. In this instance, as shown in FIG. 4, the orientation of cell H may be flipped (e.g., horizontally flipped or reversed) so as to align the first porosity segment 212A1 with the second porosity segment 212B1. By flipping the orientation of cell H, multiple first openings 220A may be achieved through the first and second porosity segments 212A1, 212B1 that enables for rail stitch insertion between the first power distribution rail 104A and the second power distribution rail 104B.

Figure 5:
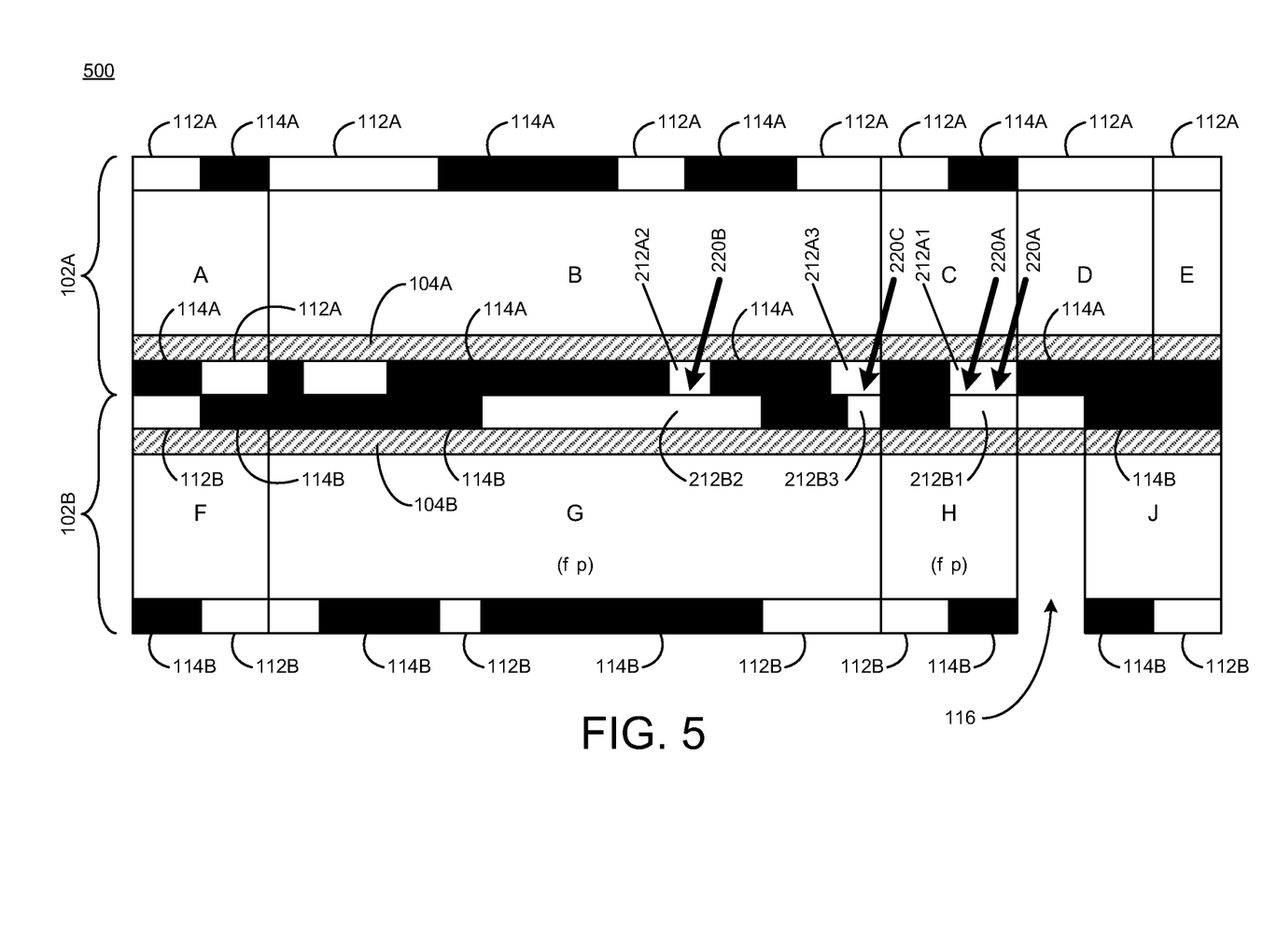

In another instance, FIG. 5 shows adjusting the position of the second row of cells 102B (e.g., cells F, G, H, J) with respect to the first row of cells 102A (e.g., cells A, B, C, D, E). This adjustment may refer to flipping orientation of one or more other cells (e.g., cell G) of the second row of cells 102B (e.g., cells F, G, H, J) relative to the first row of cells 102A (e.g., cells A, B, C, D, E) to thereby align one or more of the second porosity segments 112B with one or more of the first porosity segments 112A. In this instance, as shown in FIG. 5, the orientation of cell G may be flipped (e.g., horizontally flipped or reversed) so as to align multiple first porosity segments 212A2, 212A3 with multiple second porosity segments 212B2, 212B3. By flipping orientation of cell G, multiple first openings 220B, 220C may be achieved through the first and second porosity segments 212A2, 212A3, 212B2, 212B3 that enables for rail stitch insertion between the first power distribution rail 104A and the second power distribution rail 104B.

In some implementations, FIG. 1A shows placing or placement of the first row of cells 102A adjacent to the first power distribution rail 104A, wherein the first row of cells 102A have the first porosity segments 112A and the first blockage segments 114A. FIG. 1A also shows placing or placement of the second row of cells 102B adjacent to the second power distribution rail 104B, wherein the second row of cells 102B have the second porosity segments 112B and the second blockage segments 114B. As shown, the second porosity segments 112B and the second blockage segments 114B are offset from the first porosity segments 112A and the first blockage segments 114B. Further, FIGS. 2-5 show adjusting the position of the second row of cells 102B with respect to the first row of cells 102A to inhibit alignment of the first blockage segments 114A and the second blockage segments 114B and further facilitate the alignment of one or more of the first porosity segments 112A with one or more of the second porosity segments 112B to thereby enable rail stitch insertion between the first power distribution rail 104A and the second power distribution rail 104B.

In other implementations, FIG. 1A shows routing of the first power distribution rail 104A adjacent to the first row of cells 102A, wherein the first row of cells 102A have the first porosity segments 112A and first blockage segments 114A. FIG. 1A further show routing of the second power distribution rail 104B adjacent to the second row of cells 102B, wherein the second row of cells 102B have the second porosity segments 112B and the second blockage segments 114B. As shown, the second porosity segments 112B and the second blockage segments 114B are offset from the first porosity segments 112A and the first blockage segments 114B. Further, as described herein above, FIGS. 2-5 show adjusting the position of the second row of cells 102B with respect to the first row of cells 102A. In this instance, FIGS. 1-5 provide for inserting at least one rail stitch at a target position where one or more of the first porosity segments 112A are aligned with one or more of the second porosity segments 112B.

Figure 6:
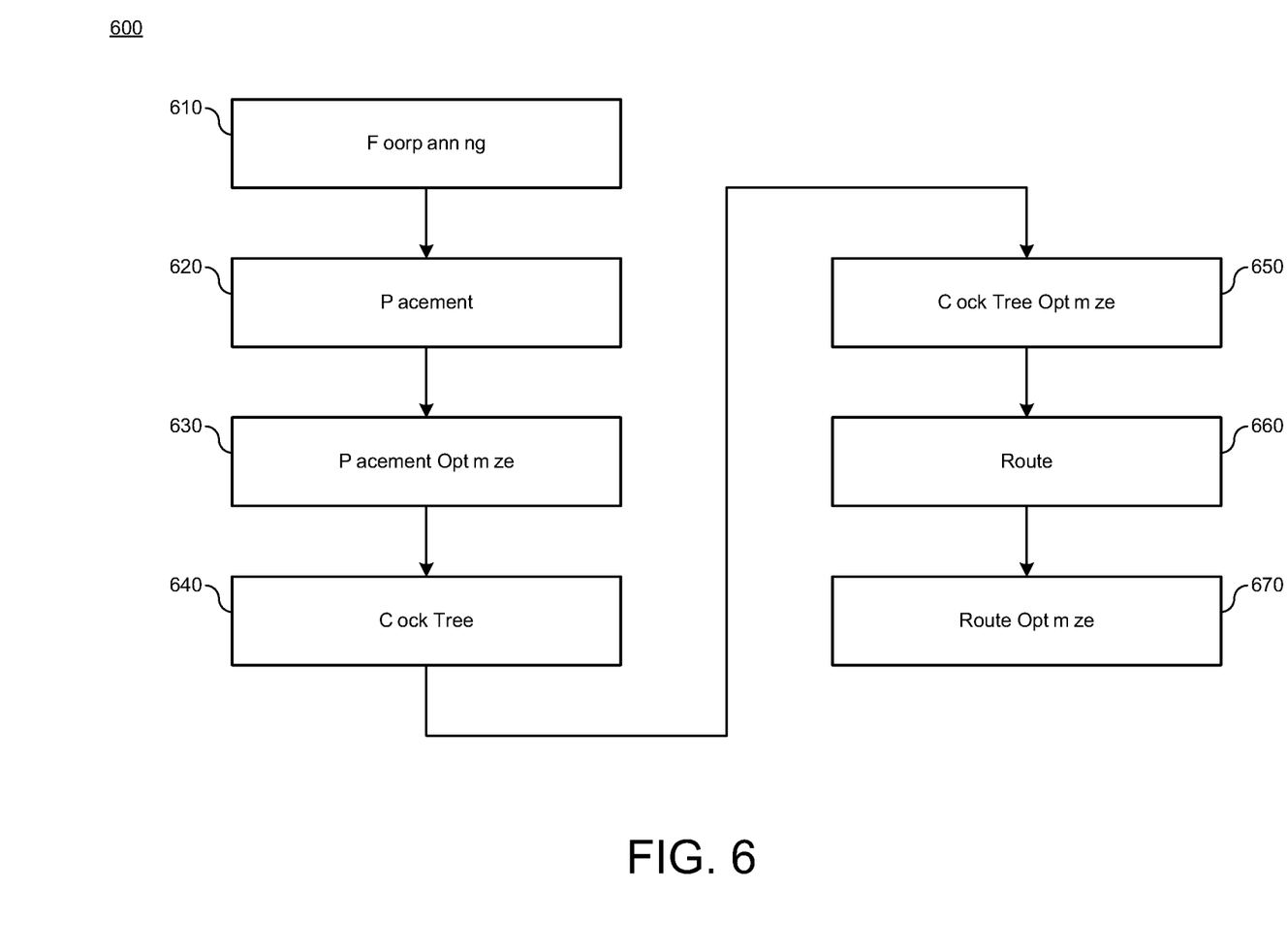
FIG. 6 illustrates an implementation flow diagram of a method (i.e., a sequence of operations) for providing (or fabricating) power distribution circuitry in accordance with implementations described herein.

FIG. 6 illustrates an implementation flow diagram of a method 600 (i.e., a sequence of operations) for providing (or fabricating) power distribution circuitry in accordance with implementations described herein.

It should be understood that even though method 600 may indicate a particular order of operation execution, in some cases, various certain portions of the operations may be executed in a different order, and on different systems. In other cases, additional operations and/or steps may be added to and/or omitted from method 600. Also, method 600 may be implemented in hardware and/or software. If implemented in hardware, the method 600 may be implemented with various circuit elements, such as described herein above in reference to FIGS. 1-5. If implemented in software, method 600 may be implemented as a program or software instruction process that may be configured for implementing power rail stitching schemes and techniques that are associated with power distribution circuitry as described herein. Further, if implemented in software, instructions related to implementing the method 600 may be stored in memory and/or a database. For instance, a computer or various other types of computing devices having a processor and memory may be configured to perform method 600.

As described and shown in reference to FIG. 6, method 600 may be used for manufacturing, or causing to be manufactured, an integrated circuit (IC) that implements power rail stitching schemes and techniques as described herein that are associated with power distribution circuitry and/or various related components and circuitry.

At block 610, method 600 may provide for floorplanning. In electronic design automation (EDA), a floorplan of an integrated circuit (IC) is associated with a schematic layout placement of its functional blocks. In the process of EDA, floorplanning refers to a design stage in an hierarchical approach to integrated circuit design.

At blocks 620 and 630, method 600 may provide for placement and placement optimization, respectively. Cell placement may be divided into two steps including a global placement step and a placement legalization step. The global placement step refers to positioning cells roughly within an optimal area, which may result in cells overlapping and not legally spaced or aligned with one another. The step that may remove the overlap and that may legally align cells relative to each other refers to the placement legalization step. In some implementations, the placement step may refer to a global placement step and a legalization step as described herein. The legalization step is where the various schemes and techniques described herein may be applied. The placement optimization step may refer to a refinement of placement that is used to improve timing. There may also be a global placement and legalization step. In this case, the already legalized cells remain as placed during the placement step. Further, some cells may be moved and some cells may be changed/added to improve timing, and those cells go through global placement and legalization during this step.

At blocks 640 and 650, method 600 may provide for a clock tree and clock tree optimization, respectively. The clock tree may refer to a clock distribution network that forms the shape of a tree, and the clock tree may refer to the distribution of clock signals from a common source to one or more or all the circuit components that utilize the clock signals. Generally, clock signal distribution is an important function to the operation of a synchronous system, and clock tree optimization seeks to improve the characteristics of these clock signals and the electrical networks that are used in their distribution. Even though clock signals may be regarded as simple control signals, these clock signals and their distribution have some special characteristics and attributes.

At block 660 and 670, method 600 provides for routing and routing optimization, respectively. In EDA, routing refers to a step in the design process of integrated circuits (ICs) and its associated circuit components. Routing builds on the preceding placement step (e.g., clock tree step 640), which is used to determine the location of each active component of an IC. After placement, the routing step inserts various conductive paths that are needed to connect the placed components in reference to design rules for the IC. Generally, design rules vary considerably from layer to layer. For instance, allowed widths and spacing on lower layers may be smaller than the allowed widths and spacing on upper layers, which may introduce misalignments between layers, such as described herein.

In some implementations, cell placement may be performed at multiple phases in a typical place and route flow. At any time cell placement occurs, the various schemes and techniques described herein may be used, or they may be used at any combination of phases depending on what approach achieves a best quality of results. FIG. 6 shows an implementation of major phases in a typical place and route flow. During each phase except for the floorplanning phase 610, cell placement may be optimized, which means that the various schemes and techniques described herein may be used at any one or all of the phases in FIG. 6 other than floorplanning.

Since some standard cells are optimally legalized for one or more or all other considerations except for stitch porosity, the schemes and techniques described herein may be used to minimize a number of cells that move/shift/flip (as shown in FIGS. 2-5) and also minimize the amount of the movement. These schemes and techniques may indicate one or more implementations that have a definition of "good enough" porosity and thereby not needing alteration. This "good enough" definition may have any number of characteristics. For instance, one characteristic may be checking the distance between legal stitch sites and creating more legal sites if the distance exceeds some target value. In another instance, a second characteristic may be checking the distance between legal stitch sites and some other structure in the power grid and then creating more legal stitch sites within the target distance. In both instances, the target distance may vary between phases. Also, it is possible to set a maximum threshold on the displacement of cells such that legal stitches will not be created if it is required to exceed that maximum threshold. In another instance, a third characteristic may be to only trigger stitch legalization optimization if the IR (current-resistance or voltage drop) analysis or EM (electro-migration) analysis of the power grid indicates a need for more stitches.

In some implementations, cell placement algorithms may use a concept of edge types that impact cell placement legalization. These edge types may be used to define which cells can legally abut and on which edges, without the placer having to analyze or even understand the design rules associated with geometries within the cells. These edge types may have strict rules indicating exactly what spacing is required between each pair of edge types. These schemes and techniques described herein may be looked upon as a new class of edge type. Instead of having a rule indicating which pairs of edge types are legal to overlap, there may be a flag to indicate to the placer that there is a preference to create said overlap according to a definition of how much overlap is "good enough".

There are two major approaches to stitch insertion. One approach may refer to fixed stitch insertion performed during floorplanning. This method 600 may provide for the simplest results and the largest amount of cell displacement, and as such, this method 600 may limit a maximum amount of cell utilization and require cell area to grow to support tighter grids. All these items may negatively impact power, performance, and/or area (PPA) of a design. Another approach may refer to a pure post route stitch insertion. In this scheme, the stitch insertion rate may be high enough to avoid various IR/EM analysis failures. If failures are seen, then manual intervention may be used to fix the flaws. This approach may lead to better power, performance, and/or area (PPA).

Figure 7:
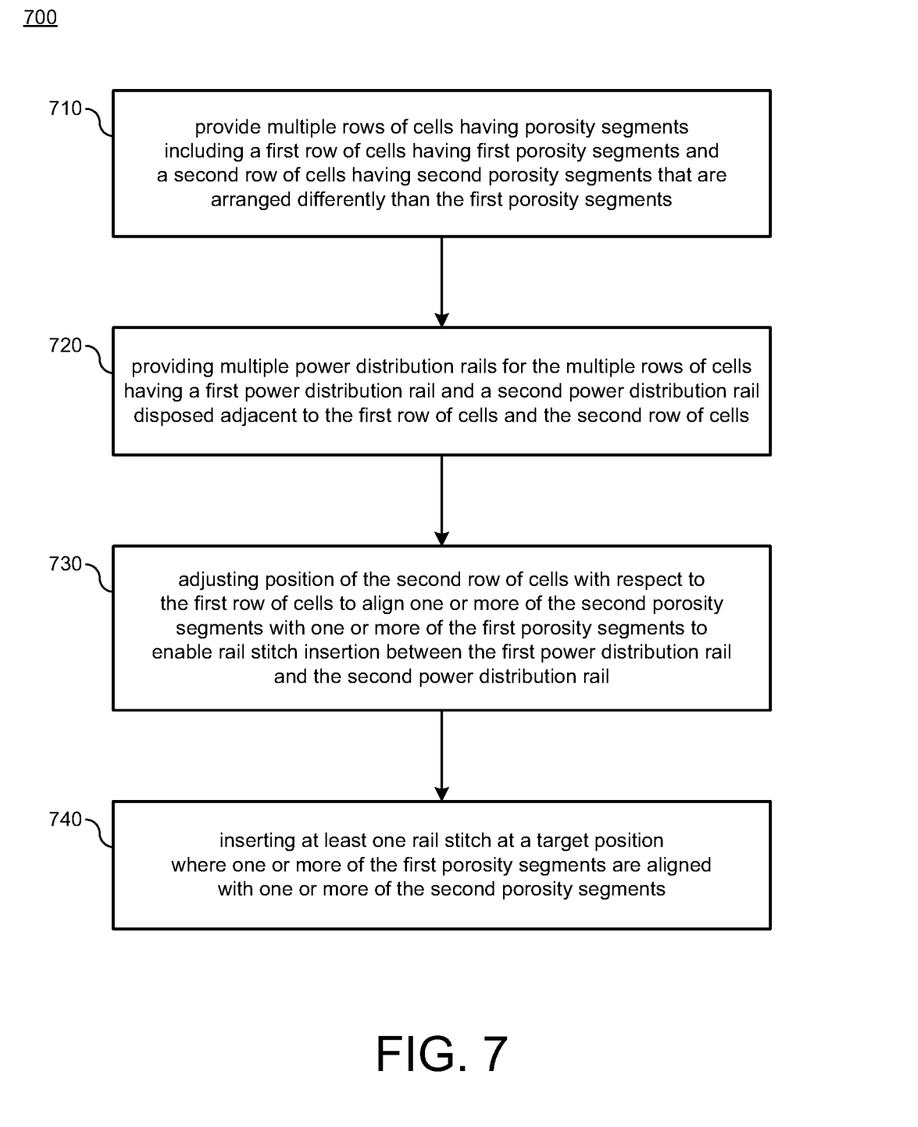
FIG. 7 illustrates a process flow diagram of a method for fabricating power distribution circuitry in accordance with implementations described herein.

FIG. 7 illustrates a process flow diagram of a method 700 for fabricating power distribution circuitry in accordance with implementations described herein.

It should be understood that even though method 700 may indicate a particular order of operation execution, in some cases, various certain portions of the operations may be executed in a different order, and on different systems. In other cases, additional operations and/or steps may be added to and/or omitted from method 700. Also, method 700 may be implemented in hardware and/or software. If implemented in hardware, the method 700 may be implemented with various circuit elements, such as described herein above in reference to FIGS. 1-6. If implemented in software, method 700 may be implemented as a program or software instruction process that may be configured for implementing power rail stitching schemes and techniques that are associated with power distribution circuitry as described herein. Further, if implemented in software, instructions related to implementing the method 700 may be stored in memory and/or a database. For instance, a computer or various other types of computing devices having a processor and memory may be configured to perform method 700.

As described and shown in reference to FIG. 7, method 700 may be used for manufacturing, or causing to be manufactured, an integrated circuit (IC) that implements power rail stitching schemes and techniques as described herein that are associated with power distribution circuitry and/or various related components and circuitry.

At block 710, method 700 provides (or fabricates) multiple rows of cells having porosity segments including, e.g., a first row of cells having first porosity segments and a second row of cells having second porosity segments that are arranged differently than the first porosity segments. The multiple rows of cells may also have blockage segments along with the porosity segments, and in this instance, the first row of cells may have first blockage segments and the second row of cells may have second blockage segments that are arranged differently than the first blockage segments. Also, alignment between the first blockage segments and the second blockage segments inhibits rail stitch insertion between the first power distribution rail and the second power distribution rail. In some instances, the second porosity segments are arranged differently than the first porosity segments such that one or more of the second porosity segments are offset from one or more of the first porosity segments.

At block 720, method 700 provides (or fabricates) multiple power distribution rails for the multiple rows of cells having a first power distribution rail and a second power distribution rail disposed adjacent to the first row of cells and the second row of cells. The second power distribution rail may be disposed away from the first power distribution rail by at least one intervening metal layer. For instance, in some instances, the first power distribution rail may refer to a first metal layer (e.g., an Mx layer), the second power distribution rail may refer to a second metal layer (e.g., an Mx+2 layer), and the intervening metal layer may refer to another metal layer (e.g., an Mx+1 layer) that is disposed between the first and second metal layers. Also, in some instances, the first and second power distribution rails may be providing power to the first and second rows of cells.

At block 730, method 700 adjusts (or modifies) the position of the second row of cells with respect to the first row of cells to align one or more of the second porosity segments with one or more of the first porosity segments to thereby enable rail stitch insertion between the first power distribution rail and the second power distribution rail. Also, at block 740, method 700 may insert at least one rail stitch at a target position where one or more of the first porosity segments are aligned with one or more of the second porosity segments. In some instances, adjusting the position of the second row of cells with respect to the first row of cells may enable the rail stitch insertion to occur at a target periodicity having a target distance between multiple rail stitches. Also, adjusting the position of the second row of cells with respect to the first row of cells may refer to shifting the position of one or more cells of the second row of cells relative to the first row of cells to align one or more of the second porosity segments with one or more of the first porosity segments. Further, adjusting the position of the second row of cells with respect to the first row of cells may be referred to as flipping orientation of one or more cells of the second row of cells relative to the first row of cells to align one or more of the second porosity segments with one or more of the first porosity segments. The rail stitch insertion between the first power distribution rail and the second power distribution rail may refer to insertion of a conductive connection between the first power distribution rail and the second power distribution rail.

In some implementations, method 700 may further insert a rail stitch at a target position where one or more of the first porosity segments are aligned with one or more of the second porosity segments. In other implementations, method 700 may further insert multiple rail stitches at multiple target positions where the first porosity segments are aligned with the second porosity segments.

Described herein are various implementations of a method. The method may include providing multiple rows of cells having porosity segments including a first row of cells having first porosity segments and a second row of cells having second porosity segments that are arranged differently than the first porosity segments. The method may include providing multiple power distribution rails for the multiple rows of cells having a first power distribution rail and a second power distribution rail disposed adjacent to the first row of cells and the second row of cells. The method may include adjusting position of the second row of cells with respect to the first row of cells to align one or more of the second porosity segments with one or more of the first porosity segments to enable rail stitch insertion between the first power distribution rail and the second power distribution rail.

Described herein are various implementations of a method. The method may include placing a first row of cells adjacent to a first power distribution rail and a second power distribution rail. The first row of cells may have first porosity segments and first blockage segments. The method may include placing a second row of cells adjacent to the first power distribution rail and the second power distribution rail. The second row of cells may have second porosity segments and second blockage segments. The second porosity segments and the second blockage segments may be offset from the first porosity segments and the first blockage segments. The method may include adjusting position of the second row of cells with respect to the first row of cells to facilitate alignment of one or more of the first porosity segments with one or more of the second porosity segments to thereby avoid the first blockage segments and the second blockage segments and so as to enable rail stitch insertion between the first power distribution rail and the second power distribution rail.

Described herein are various implementations of a method. The method may include routing a first power distribution rail and a second power distribution rail adjacent to a first row of cells. The first row of cells may have first porosity segments and first blockage segments. The method may include routing a second row of cells adjacent to the first power distribution rail and the second power distribution rail. The second row of cells may have second porosity segments and second blockage segments. The second porosity segments and the second blockage segments may be offset from the first porosity segments and the first blockage segments. The method may include adjusting position of the second row of cells with respect to the first row of cells to inhibit alignment of the first blockage segments and the second blockage segments and to facilitate alignment of one or more of the first porosity segments with one or more of the second porosity segments to thereby enable rail stitch insertion between the first power distribution rail and the second power distribution rail. The method may include inserting at least one rail stitch at a target position where one or more of the first porosity segments are aligned with one or more of the second porosity segments.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
providing multiple rows of cells having porosity segments comprising a first row of cells having first porosity segments and a second row of cells having second porosity segments that are arranged differently than the first porosity segments;
providing multiple power distribution rails for the multiple rows of cells having a first power distribution rail and a second power distribution rail disposed adjacent to the first row of cells and the second row of cells; and
adjusting position of the second row of cells with respect to the first row of cells to align one or more of the second porosity segments with one or more of the first porosity segments to enable rail stitch insertion between the first power distribution rail and the second power distribution rail.

2. The method of claim 1, further comprising inserting the rail stitch at a target position where one or more of the first porosity segments are aligned with one or more of the second porosity segments.

3. The method of claim 1, further comprising inserting multiple rail stitches at multiple target positions where the first porosity segments are aligned with the second porosity segments.

4. The method of claim 1, wherein the multiple rows of cells have blockage segments along with the porosity segments, and wherein the first row of cells have first blockage segments and the second row of cells have second blockage segments that are arranged differently than the first blockage segments.

5. The method of claim 4, wherein alignment between the first blockage segments and the second blockage segments inhibits the rail stitch insertion between the first power distribution rail and the second power distribution rail.

6. The method of claim 1, wherein the second power distribution rail is disposed away from the first power distribution rail by at least one intervening metal layer.

7. The method of claim 1, wherein adjusting the position of the second row of cells with respect to the first row of cells enables the rail stitch insertion to occur at a target periodicity having a target distance between multiple rail stitches.

8. The method of claim 1, wherein the second porosity segments are arranged differently than the first porosity segments such that one or more of the second porosity segments are offset from one or more of the first porosity segments.

9. The method of claim 1, wherein adjusting the position of the second row of cells with respect to the first row of cells refers to shifting a position of one or more cells of the second row of cells relative to the first row of cells to align one or more of the second porosity segments with one or more of the first porosity segments.

10. The method of claim 1, wherein adjusting the position of the second row of cells with respect to the first row of cells refers to flipping an orientation of one or more cells of the second row of cells relative to the first row of cells to align one or more of the second porosity segments with one or more of the first porosity segments.

11. The method of claim 1, wherein the rail stitch insertion between the first power distribution rail and the second power distribution rail refers to insertion of a conductive connection between the first power distribution rail and the second power distribution rail.

12. A method, comprising:
   placing a first row of cells adjacent to a first power distribution rail and a second power distribution rail, wherein the first row of cells have first porosity segments and first blockage segments;
   placing a second row of cells adjacent to the first power distribution rail and the second power distribution rail, wherein the second row of cells have second porosity segments and second blockage segments, and wherein the second porosity segments and the second blockage segments are offset from the first porosity segments and the first blockage segments; and
   adjusting position of the second row of cells with respect to the first row of cells to facilitate alignment of one or more of the first porosity segments with one or more of the second porosity segments to thereby avoid the first blockage segments and the second blockage segments and so as to enable rail stitch insertion between the first power distribution rail and the second power distribution rail.

13. The method of claim 12, further comprising inserting at least one rail stitch at a target position where one or more of the first porosity segments are aligned with one or more of the second porosity segments.

14. The method of claim 12, wherein adjusting the position of the second row of cells with respect to the first row of cells refers to shifting a position of one or more cells of the second row of cells relative to the first row of cells to align one or more of the first porosity segments with one or more of the second porosity segments.

15. The method of claim 12, wherein adjusting the position of the second row of cells with respect to the first row of cells refers to flipping an orientation of one or more cells of the second row of cells relative to the first row of cells to align one or more of the first porosity segments with one or more of the second porosity segments.

16. The method of claim 12, wherein the rail stitch insertion between the first power distribution rail and the second power distribution rail refers to insertion of a conductive connection between the first power distribution rail and the second power distribution rail.

17. A method, comprising:
   routing a first power distribution rail and a second power distribution rail adjacent to a first row of cells, wherein the first row of cells have first porosity segments and first blockage segments;
   routing a second row of cells adjacent to the first power distribution rail and the second power distribution rail, wherein the second row of cells have second porosity segments and second blockage segments, and wherein the second porosity segments and the second blockage segments are offset from the first porosity segments and the first blockage segments;
   adjusting position of the second row of cells with respect to the first row of cells to inhibit alignment of the first blockage segments and the second blockage segments and to facilitate alignment of one or more of the first porosity segments with one or more of the second porosity segments to thereby enable rail stitch insertion between the first power distribution rail and the second power distribution rail; and
   inserting at least one rail stitch at a target position where one or more of the first porosity segments are aligned with one or more of the second porosity segments.

18. The method of claim 17, wherein adjusting the position of the second row of cells with respect to the first row of cells refers to shifting a position of one or more cells of the second row of cells relative to the first row of cells to align one or more of the first porosity segments with one or more of the second porosity segments.

19. The method of claim 17, wherein adjusting the position of the second row of cells with respect to the first row of cells refers to flipping an orientation of one or more cells of the second row of cells relative to the first row of cells to align one or more of the first porosity segments with one or more of the second porosity segments.

20. The method of claim 17, wherein the rail stitch insertion between the first power distribution rail and the second power distribution rail refers to insertion of a conductive connection between the first power distribution rail and the second power distribution rail.

* * * * *